United States Patent
Chiang et al.

(10) Patent No.: US 9,860,930 B2
(45) Date of Patent: Jan. 2, 2018

(54) METHOD TO SET UP A WIRELESS COMMUNICATION CONNECTION AND ELECTRONIC DEVICE UTILIZING THE SAME

(71) Applicant: MediaTek Inc., Hsin-Chu (TW)

(72) Inventors: Tsung-Yueh Chiang, Taichung (TW); Jia-Chang Lin, Taipei (TW); Jing-Kuang Huang, Hsinchu (TW); Yu-Chieh Chien, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/782,993

(22) PCT Filed: Feb. 17, 2015

(86) PCT No.: PCT/CN2015/073230
§ 371 (c)(1),
(2) Date: Oct. 7, 2015

(87) PCT Pub. No.: WO2015/124111
PCT Pub. Date: Aug. 27, 2015

(65) Prior Publication Data
US 2016/0345372 A1  Nov. 24, 2016

Related U.S. Application Data

(60) Provisional application No. 61/942,798, filed on Feb. 21, 2014.

(51) Int. Cl.
*H04B 5/00* (2006.01)
*G06F 3/00* (2006.01)
(Continued)

(52) U.S. Cl.
CPC ........ *H04W 76/023* (2013.01); *G06F 3/0416* (2013.01); *H04B 5/0012* (2013.01);
(Continued)

(58) Field of Classification Search
USPC ........................................................ 455/41.1
See application file for complete search history.

(56) References Cited

U.S. PATENT DOCUMENTS 9,281,870 B2  3/2016  Huang et al.
2011/0276911 A1*  11/2011  Choi ...................... G06F 9/4445
                                                  715/769
(Continued)

FOREIGN PATENT DOCUMENTS

CN  102468871  5/2012
CN  102723971  10/2012
(Continued)

OTHER PUBLICATIONS

International Search Report dated May 19, 2015, issued in PCT/CN2015/073230.

*Primary Examiner* — Ganiyu A Hanidu
(74) *Attorney, Agent, or Firm* — McClure, Qualey & Rodack, LLP

(57) ABSTRACT

An electronic device includes a processor and a wireless communication module, The processor transmits one or more touch link messages via at least one transmitting electrode of a touch panel device to another electronic device in proximity to the electronic device and receives one or more touch link messages via at least one receiving electrode of the touch panel device from the other electronic device to obtain essential information for establishing a wireless communication connection with the other electronic device. The wireless communication module establishes a wireless communication connection with the other electronic device according to the essential information.

18 Claims, 21 Drawing Sheets

(51) Int. Cl.
*H04W 76/02* (2009.01)
*G06F 3/041* (2006.01)
*H04W 4/00* (2009.01)
*H04W 80/02* (2009.01)

(52) U.S. Cl.
CPC .......... *H04B 5/0031* (2013.01); *H04W 4/008* (2013.01); *H04W 80/02* (2013.01)

(56) References Cited

U.S. PATENT DOCUMENTS

| | | |
|---|---|---|
| 2011/0304583 A1 | 12/2011 | Kruglick |
| 2012/0154109 A1 | 6/2012 | Chen et al. |
| 2012/0317194 A1* | 12/2012 | Tian ...................... H04W 8/005 709/204 |
| 2013/0019193 A1* | 1/2013 | Rhee ...................... G06F 3/0486 715/769 |
| 2013/0036231 A1* | 2/2013 | Suumaki ............... H04W 12/04 709/228 |
| 2013/0137368 A1 | 5/2013 | Jiang et al. |
| 2014/0065960 A1* | 3/2014 | Gang ................... H04B 5/0031 455/41.1 |
| 2014/0152597 A1* | 6/2014 | Lee ....................... G06F 3/0416 345/173 |
| 2014/0192008 A1* | 7/2014 | Teissier ................. G06F 3/0416 345/174 |
| 2014/0199944 A1 | 7/2014 | Ran et al. |

FOREIGN PATENT DOCUMENTS

| | | |
|---|---|---|
| CN | 102916729 | 2/2013 |
| EP | 2 813 928 A1 | 12/2014 |
| WO | WO 2013/135004 A1 | 9/2013 |

\* cited by examiner

METHOD TO SET UP A WIRELESS COMMUNICATION CONNECTION AND ELECTRONIC DEVICE UTILIZING THE SAME

CROSS REFERENCE TO RELATED APPLICATIONS

This application is a National Phase Patent Application of PCT Application No. PCT/CN2015/073230, filed on Feb. 17, 2015, which claims the benefit of U.S. Provisional Application No. 61/942,798 filed 2014 Feb. 21 and entitled "Fast Setup WiFi-Direct Connection Through Hotknot", the entire contents of which are hereby incorporated by reference.

TECHNICAL FIELD

The invention relates to methods for setup wireless communication connection, and more particularly to methods for setup wireless communication connection via touch communications technology.

BACKGROUND

NFC (Near Field Communication) is a contactless identification and interconnection technology, which allows users to intuitively exchange information and access content and services among mobile devices, consumer electronics, personal computers, or intelligent electronic devices by methods of near magnetic field communication, such as using 13.56 MHz of near magnetic field communication.

Since the market demand for integrated NFC in handheld devices such as mobile phones is mature, NFC supports mobile payment or can act as a point-of-sale (POS) system. However, since NFC is based on magnetic fields to transmit and receive signals, it is necessary to install inductive card reader or some elements with a similar function to handheld devices or mobile phones, which causes the handheld devices to become bigger and is a limitation to the structured layout and component material of the mobile phones and other handheld devices.

Therefore, there is a recently developed touch communications technology for a touch-panel device, such as that recited in patent applications US 2011/0304583, US 2013/0147760, and CN 102916729A, which communicates by the original panel and the original driver IC of the touch-panel device. The touch-panel device includes a touch sensor. At least a portion of the touch sensor is at least a portion of the touch panel included in the touch-panel device. The touch panel could be a touch panel without a display function (e.g. a touch pad) or a touch panel with a display function (e.g. a touch screen). The touch sensor includes a plurality of driving electrodes and a plurality of sensing electrodes which constitute capacitive structures on a substrate. At least one of the driving electrode and the sensing electrode can act as a transmitting electrode, and at least one of the driving electrode and the sensing electrode can act as a receiving electrode. Therefore, the signals can be transmitted and received by the original electrode and the original driving IC of the touch-panel device, to realize touch communications based on electric fields without an inductive card reader or components with a similar function being incorporated. It saves volume and cost than the previous near field communication technology.

FIG. 1 is a schematic diagram illustrating touch communications between the first touch-panel device and the second touch-panel device in accordance with the prior art. As shown in FIG. 1, there are near electric fields 103a and 103b between the first touch-panel device 101 and the second touch-panel device 102. It should be noted that the first touch-panel device 101 and the second touch-panel device 102 are both capable of transmitting and receiving signals. In the touch communications technology, when the first touch-panel device 101 transmits a signal to the second touch-panel device 102, the communication media of the transmission is the electric field whose direction is toward the second touch-panel device 102 (the near electric field 103a shown in FIG. 1). When the second touch-panel device 102 transmits a signal to the first touch-panel device 101, the communication media of the transmission is the electric field whose direction is toward the first touch-panel device 101 (the near electric field 103b shown in FIG. 1). The X channel and Y channel shown in FIG. 1 represent the transmitting electrode and the receiving electrode, respectively, which constitute capacitive structures on the substrate.

FIG. 2 is a block diagram of the implemented touch communications system between the first touch-panel device and the second panel device in accordance with the prior art. The first touch-panel device 101 includes the signal-transmitting system 201 which is shown in FIG. 2, and the second touch-panel device 102 includes the signal-receiving system 202, which is shown in FIG. 2. The signal-transmitting system 201 includes the touch-communications-request signal generation unit 211, the communications connection establishment unit 212, and the first communications unit 213. The touch-communications-request signal generation unit 211 is used to generate a touch-communications-request signal which is transmitted to the second touch-panel device 102 via the transmitting electrode. After the receiving electrode receives the response signal as a reply from the second touch-panel device 102, the communications connection establishment unit 212 performs actions to establish the communications connection with the second touch-panel device 102. After establishing the communications connection, the first communications unit 213 can transmit information and/or data to the second touch-panel device 102 via the transmitting electrode.

The signal-receiving system 202 includes the touch-communications-request response unit 221, the communications connection establishment unit 222, and the second communications unit 223. After the touch-communications-request response unit 221 receives the touch-communications request signal, which is transmitted by the first touch-panel device 101, via the receiving electrode, a response signal is sent in reply to the first touch-panel device 101 via the transmitting electrode. After the touch-communications-request response unit 221 replies with the response signal to the first touch-panel device 101, the communications connection establishment unit 222 helps establish communications connection with the first touch-panel device 101. After the communications connection is established, the second communications unit 223 can receive information and/or data from the first touch-panel device 101 via the receiving electrode.

As shown in FIG. 3, the first touch panel 301 and the second touch panel 302 further includes a touch sensor (not fully shown in FIG. 3), where the touch sensor includes a plurality of transmitting electrodes 311, 321 and the receiving electrodes 312, 322, which constitute capacitive structures on the substrate and are respectively used to transmit and to receive the signals.

FIG. 4 is a flow chart of the touch communications method in accordance with the prior art. First, in Step S401, the touch-communications-request signal generation unit 211 generates a touch-communications-request signal which is transmitted to the second touch-panel device 102 via the transmitting electrode. Then, after the receiving electrode receives the response signal replied by the second touch-panel device 102 (Step S402), the communications connection establishment unit 212 helps establish the communications connection with the second touch-panel device 102 (Step S403). Finally, in Step S404, the first communications unit 213, by the transmitting electrode, can transmit information and/or data to the second touch-panel device 102.

In the prior art, there are several complicated steps involved when setting up a wireless communication connection, such as device discovery, GO negotiation, bonding . . . etc. Therefore, novel electronic devices and methods are required to simplify the set up procedure.

SUMMARY

Electronic devices and methods to quickly set up a wireless communication connection are provided. An exemplary embodiment of an electronic device comprises a processor and a wireless communication module. The processor transmits one or more touch link messages via at least one transmitting electrode of a touch panel device to another electronic device in proximity to the electronic device and receives one or more touch link messages via at least one receiving electrode of the touch panel device from the other electronic device to obtain essential information for establishing a wireless communication connection with the other electronic device. The wireless communication module establishes the wireless communication connection with the other electronic device according to the essential information.

An exemplary embodiment of a method to quickly set up a wireless communication connection comprises: transmitting one or more first touch link messages via at least one transmitting electrode of a touch panel device of a first electronic device to a second electronic device in proximity to the first electronic device; receiving one or more second touch link messages via at least one receiving electrode of the touch panel device of the first electronic device from the second electronic device; obtaining essential information of the second electronic device for establishing a wireless communication connection from the one or more second touch link messages; and establishing the wireless communication connection between the first electronic device and the second electronic device according to the essential information of the second electronic device.

An exemplary embodiment of a method fast setup wireless communication connection comprises: receiving one or more first touch link messages via at least one receiving electrode of a touch panel device of a first electronic device from a second electronic device in proximity to the first electronic device; packing essential information of the first electronic device for establishing a wireless communication connection in one or more second touch link messages; transmitting the one or more second touch link messages via at least one transmitting electrode of the touch panel device of the first electronic device to the second electronic device; and establishing the wireless communication connection between the first electronic device and the second electronic device according to the essential information of the first electronic device.

In the embodiments of the invention, because the essential information of a first electronic device required for establishing a wireless communication connection is provided to a second electronic device, or the essential information of a second electronic device required for establishing a wireless communication connection is received from the second electronic device, or the essential information of a first electronic device and a second electronic device required for establishing a wireless communication connection is exchanged between the first electronic device and the second electronic device via the touch link messages which are transmitted or received via at least one transmitting or receiving electrode of a touch panel device of the corresponding electronic device, at least some of the complicated steps involved when setting up a wireless communication connection as discussed above can be skipped, and the set up procedure can be simplified.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
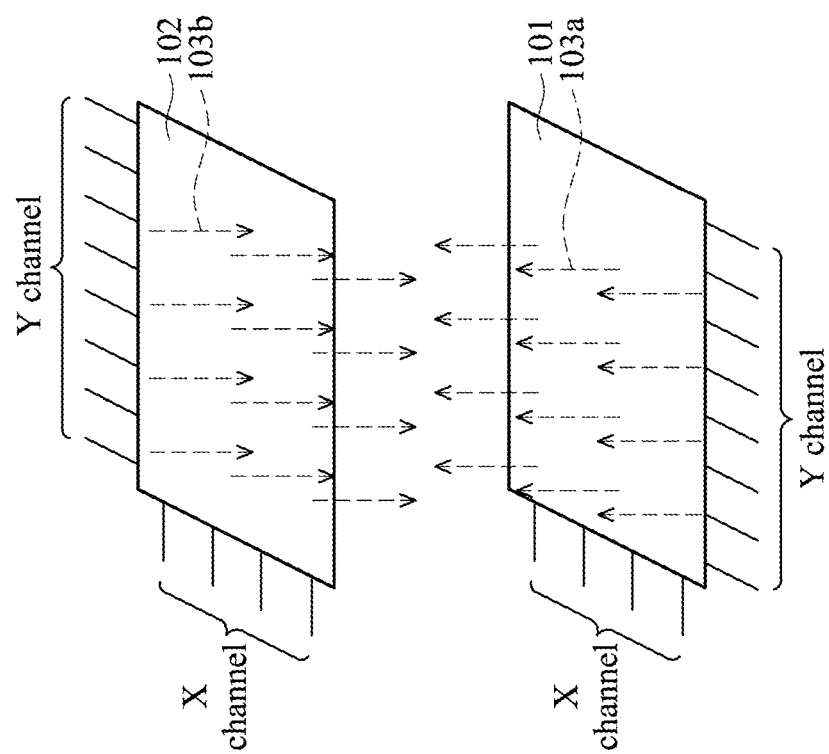
FIG. 1 is a schematic diagram illustrating touch communications between the first touch-panel device and the second touch-panel device in accordance with the prior art.
Figure 2:
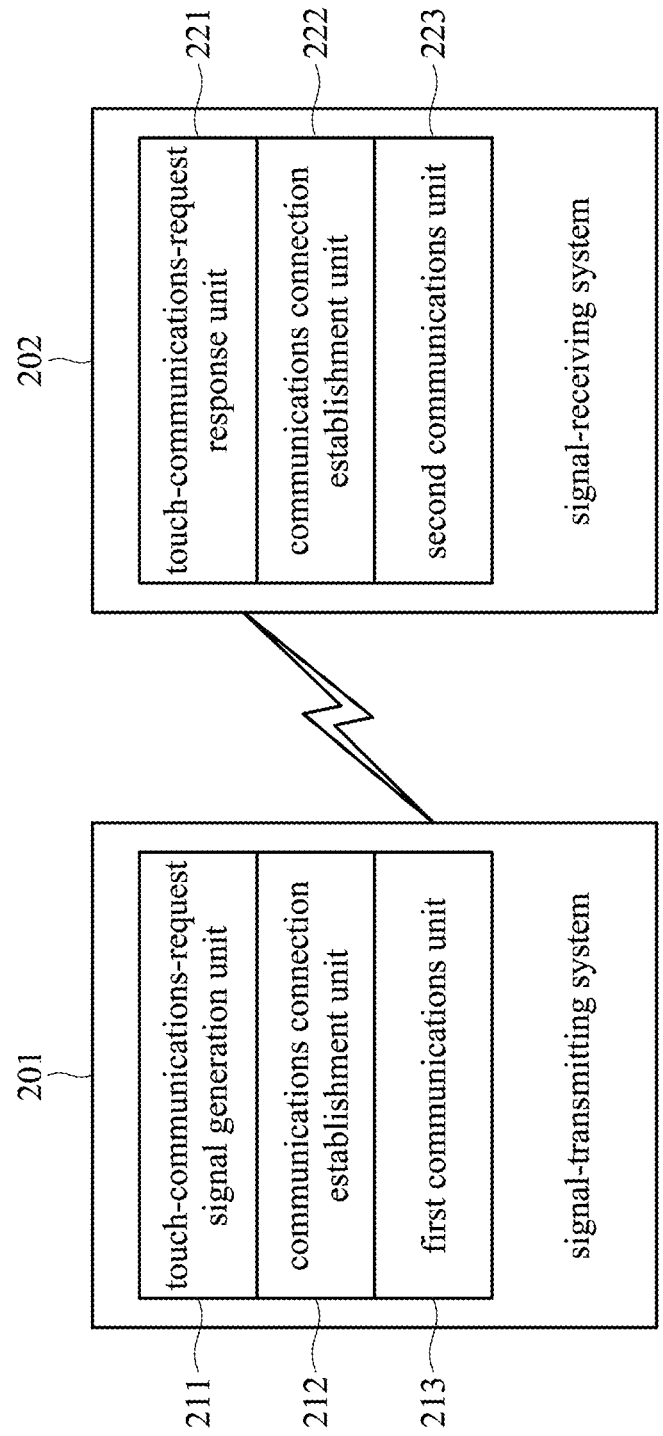
FIG. 2 is a block diagram of the implemented touch communications system between the first touch-panel device and the second panel device in accordance with the prior art.
Figure 3:
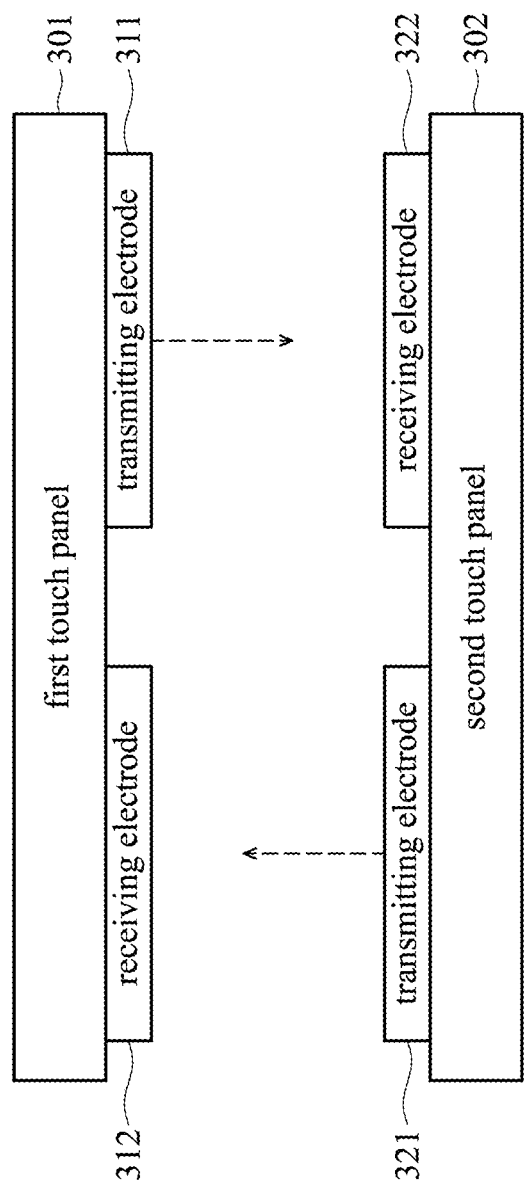
FIG. 3 is a schematic diagram of the first touch-panel device and the second touch-panel device in accordance with the prior art.
Figure 4:
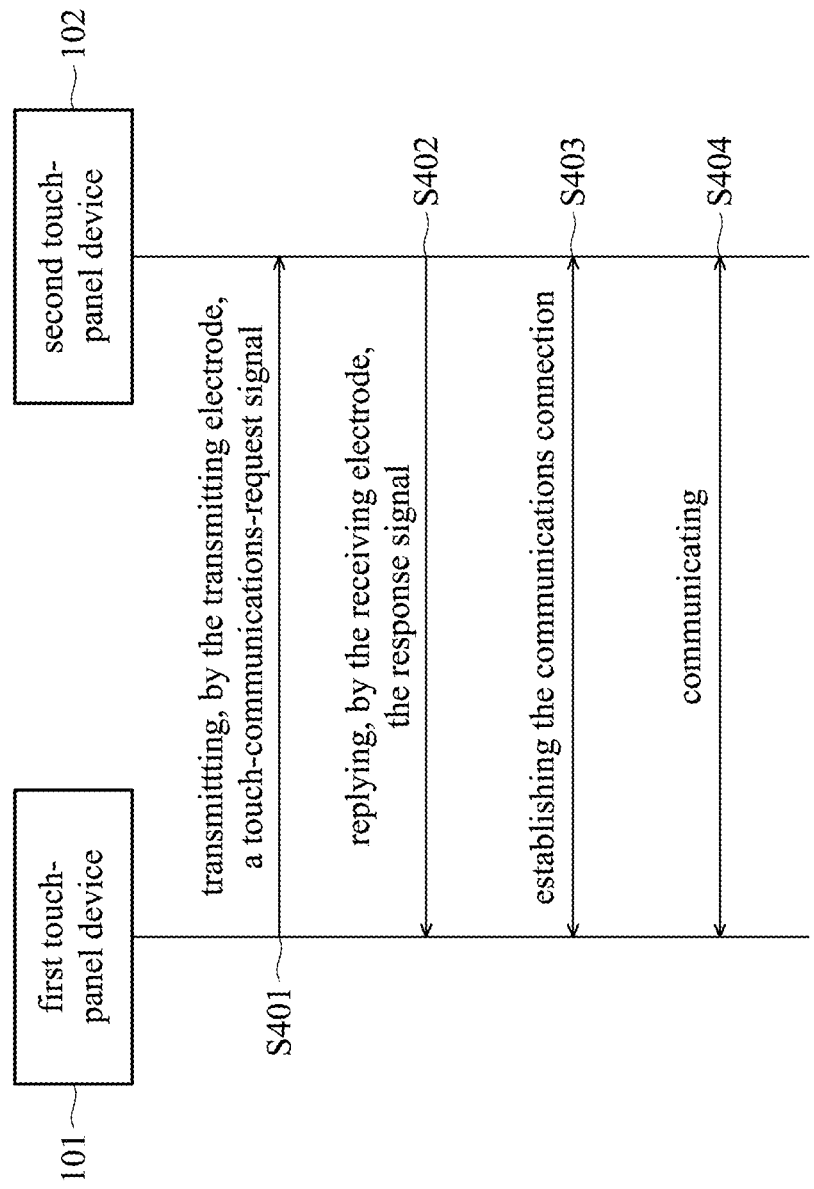
FIG. 4 is a flow chart of the touch communications method in accordance with the prior art.
Figure 5:
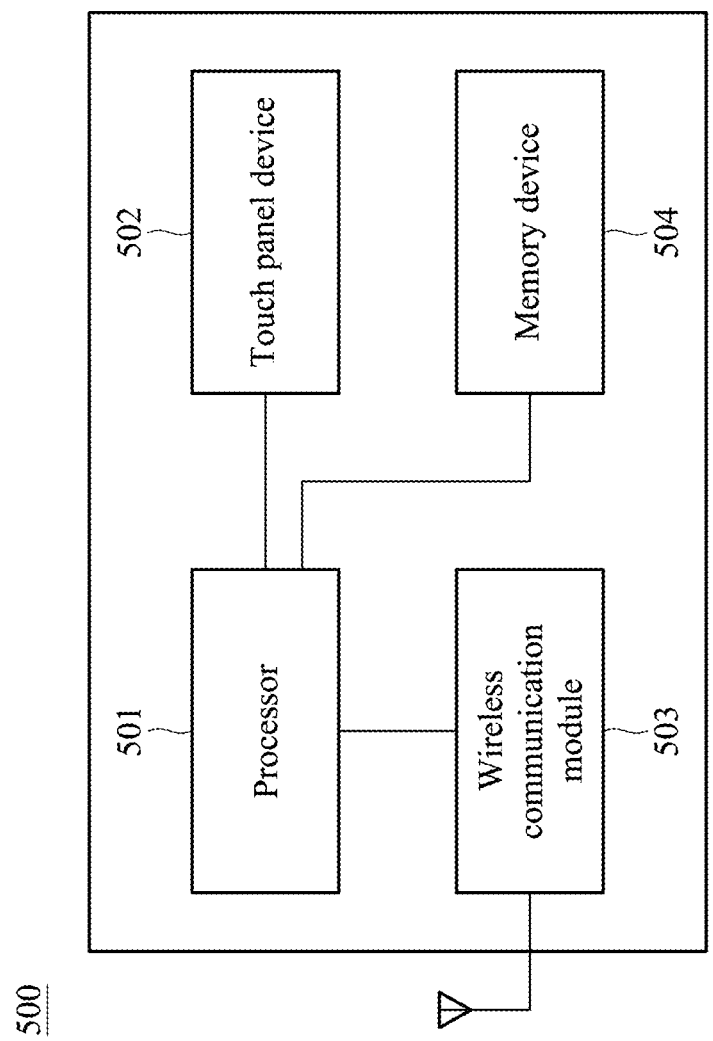
FIG. 5 shows a block diagram of an electronic device according to an embodiment of the invention.

FIG. 5 shows a block diagram of an electronic device according to an embodiment of the invention. According to an embodiment of the invention, the electronic device 500 may comprise a processor 501, a touch panel device 502, a wireless communication module 503 coupled to an antenna module comprising at least one antenna, and a memory device 504. According to an embodiment of the invention, the touch panel device 502 may support the touch communications technology illustrated above. The wireless communication module 503 may comprise a baseband signal processing device (not shown) configured to process baseband signals and an RF signal processing device (not shown) configured to process RF signals. The memory device 504 may store system data, user data and/or program codes of the electronic device 500.

According to an embodiment of the invention, based on the touch communications technology, two electronic devices (such as the electronic device 500) supporting the touch communications technology and in proximity to each other can communicate with each other through the corresponding touch panel devices (such as the touch panel device 502). In this embodiment, two devices are in proximity to each other may mean that the two devices are in contact with or close to each other. In this embodiment, the two devices are in contact with or close to each other may mean that the distance between the two devices is not larger than a predetermined distance. For example, if the predetermined distance is 2 cm, the two devices are in contact with or close to each other may mean that the distance between the two devices is not larger than 2 cm. This is for illustrative purpose only, but not a limitation. The predetermined distance may vary with the touch panel, its driving IC, and the design of the device, and may be greater, such as 5 cm, or may be less, such as 2 mm, and so on. In the communication through the touch panel devices, one of the two electronic devices may provide or receive essential information required to further establish a wireless communication connection to another or from another, or the two electronic devices may exchange essential information required to further establish a wireless communication connection therebetween. Because the essential information required for establishing the wireless communication connection is obtained (that is, for example, provided, received or exchanged) through the touch panel devices, fast setup wireless communication connection can be achieved.

According to an embodiment of the invention, the processor 501 of the electronic device 500 supporting the touch communications technology may transmit one or more touch link messages via at least one transmitting electrode (e.g. the transmitting electrodes 311/321) of the touch panel device 502 to another electronic device (not shown) in proximity to the electronic device 500 and supporting the touch communications technology, and may receive one or more touch link messages via at least one receiving electrode (e.g. the receiving electrodes 312/322) of the touch panel device 502 from the other electronic device, to provide, receive or exchange essential information for establishing a wireless communication connection. After obtaining the essential information utilized for establishing the wireless communication connection, the wireless communication module 503 may further establish a wireless communication connection with the other electronic device according to the essential information.

Figure 6:
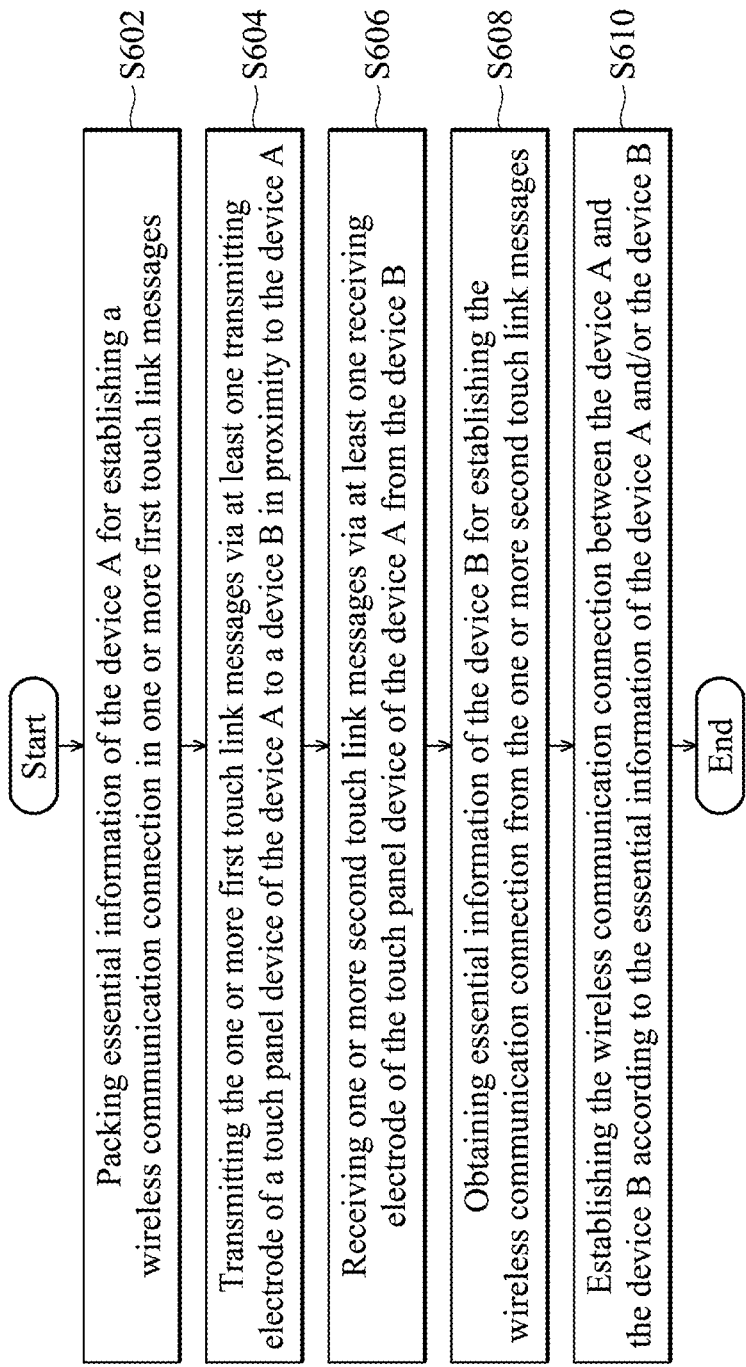
FIG. 6 shows a flow chart of a method to set up a wireless communication connection from the perspective of a sender initiating the touch link according to an embodiment of the invention.

FIG. 6 shows a flow chart of a method to set up a wireless communication connection from the perspective of a sender (device A in this embodiment) initiating the touch link according to an embodiment of the invention. Device A may pack essential information of device A for establishing a wireless communication connection in one or more first touch link messages (Step S602). Device A may transmits the one or more first touch link messages via at least one transmitting electrode of a touch panel device of device A to a device B in proximity to device A (Step S604). Device A may receive one or more second touch link messages via at least one receiving electrode of the touch panel device of device A from device B (S606). Device A may obtain essential information of device B for establishing the wireless communication connection from the one or more second touch link messages (Step S608). And device A may establish the wireless communication connection between device A and device B according to the essential information of device A and/or device B (Step S610). It should be noted that according to different embodiments, one or more steps shown in FIG. 6 may be omitted, and one or more steps may be added. Besides, the order of the steps is not limited to the order shown in FIG. 6, and may be performed in any other order. In this embodiment, two devices are in proximity to each other may mean that the two devices are in contact with or close to each other. In this embodiment, the two devices are in contact with or close to each other may mean that the distance between the two devices is not larger than a predetermined distance. For example, if the predetermined distance is 2 cm, the two devices are in contact with or close to each other may mean that the distance between the two devices is not larger than 2 cm. This is for illustrative purpose only, but not a limitation. The predetermined distance may vary with the touch panel, its driving IC, and the design of the device, and may be greater, such as 5 cm, or may be less, such as 2 mm, and so on.

Figure 7:
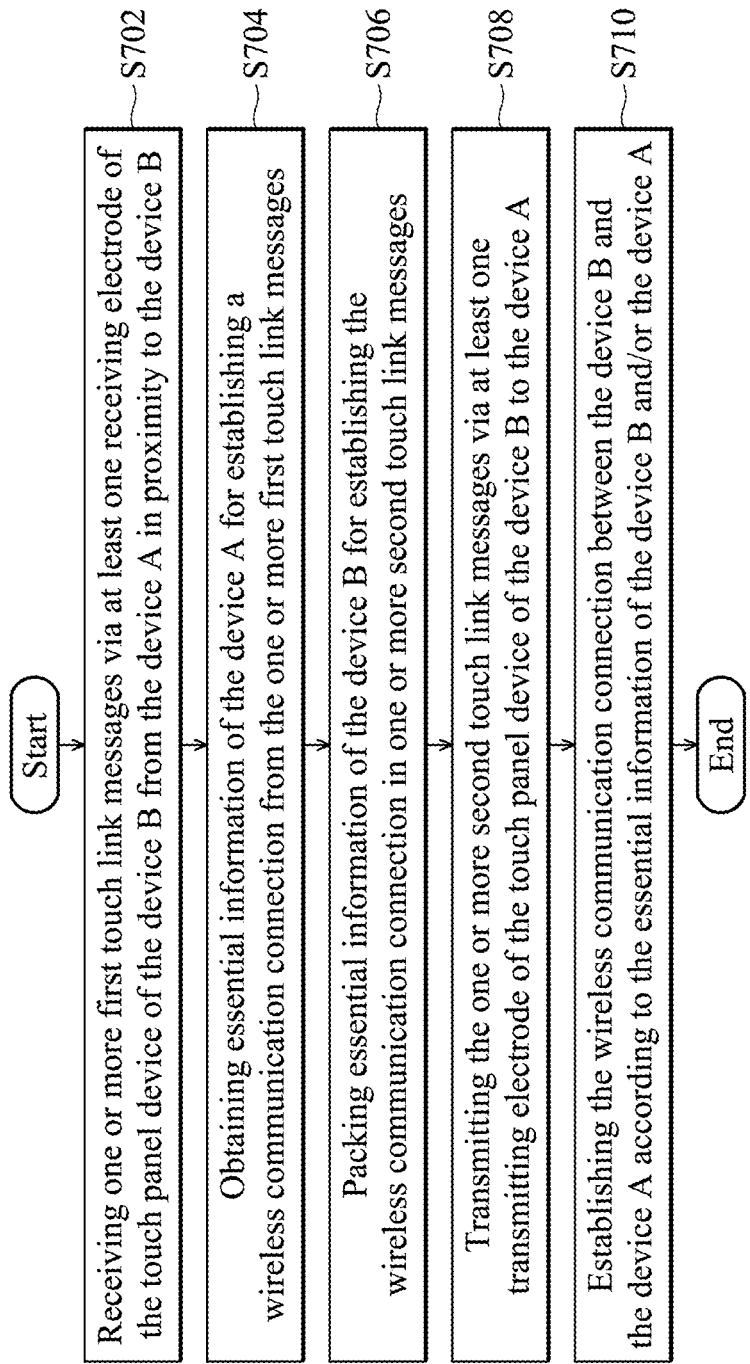
FIG. 7 shows a flow chart of a method to set up a wireless communication connection from the perspective of a receiver according to another embodiment of the invention.

FIG. 7 shows a flow chart of a method to set up a wireless communication connection from the perspective of a receiver (device B in this embodiment) receiving touch link message(s) from a sender(device A in this embodiment) initiating the touch link according to another embodiment of the invention. Device B may receive one or more first touch link messages via at least one receiving electrode of the touch panel device of device B from device A in proximity to device B (Step S702). Device B may obtain essential information of device A for establishing a wireless communication connection from the one or more first touch link messages (Step S704). Device B may pack essential information of device B for establishing the wireless communication connection in one or more second touch link messages (Step S706). Device B may transmits the one or more second touch link messages via at least one transmitting electrode of the touch panel device of device B to device A (Step S708). And Device B may establish the wireless communication connection between device B and device A according to the essential information of device B and/or device A (Step S710). It should be noted that according to different embodiments, one or more steps shown in FIG. 7 may be omitted, and one or more steps may be added. Besides, the order of the steps is not limited to the order shown in FIG. 7, and may be performed in any other order. In this embodiment, two devices are in proximity to each other may mean that the two devices are in contact with or close to each other. In this embodiment, the two devices are in contact with or close to each other may mean that the distance between the two devices is not larger than a predetermined distance. For example, if the predetermined distance is 2 cm, the two devices are in contact with or close to each other may mean that the distance between the two devices is not larger than 2 cm. This is for illustrative purpose only, but not a limitation. The predetermined distance may vary with the touch panel, its driving IC, and the design of the device, and may be greater, such as 5 cm, or may be less, such as 2 mm, and so on.

According to an embodiment of the invention, the wireless communication module 503 is a Wi-Fi communication module, and the wireless communication connection established according to the essential information is a Wi-Fi Direct connection. According to another embodiment of the invention, the wireless communication module 503 is a Bluetooth communication module, and the wireless communication connection established according to the essential information is a Bluetooth connection.

Figure 8:
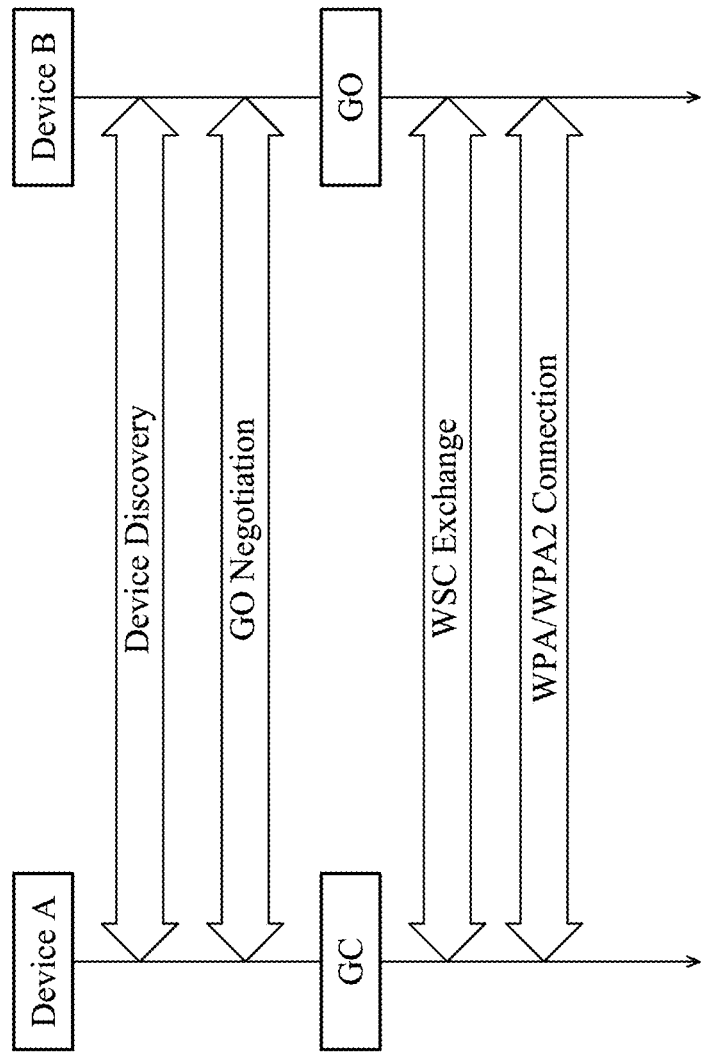
FIG. 8 is a schematic diagram showing the prior art procedure of establishing a Wi-Fi Direct connection in compliance with a Wi-Fi Direct standard.

FIG. 8 is a schematic diagram showing the prior art procedure of establishing a Wi-Fi Direct connection in compliance with a Wi-Fi Direct standard. Wi-Fi Direct is a communication protocol that Wi-Fi device can connect to each other without an Access Point (AP). In the prior art procedure of establishing a Wi-Fi Direct connection, two electronic devices such as device A and device B first perform device discovery to discover and be aware of the capability of each other. When the device A and device B found each other, a P2P group is formed among these two electronic devices, so as a Wi-Fi P2P network. The device A and device B may perform Group Owner (GO) negotiation to negotiate which device plays the role of a GO and which device plays the role of a Group Client (GC). After determining the roles, the device A and device B may perform a Wi-Fi simple configuration (WSC) exchange procedure to configure security features. After performing the WSC exchange, the formation is completed, and the Wi-Fi Direct connection under Wi-Fi Protected Access WPA/WPA2 protection is established between the device A and device B.

Figure 9A:
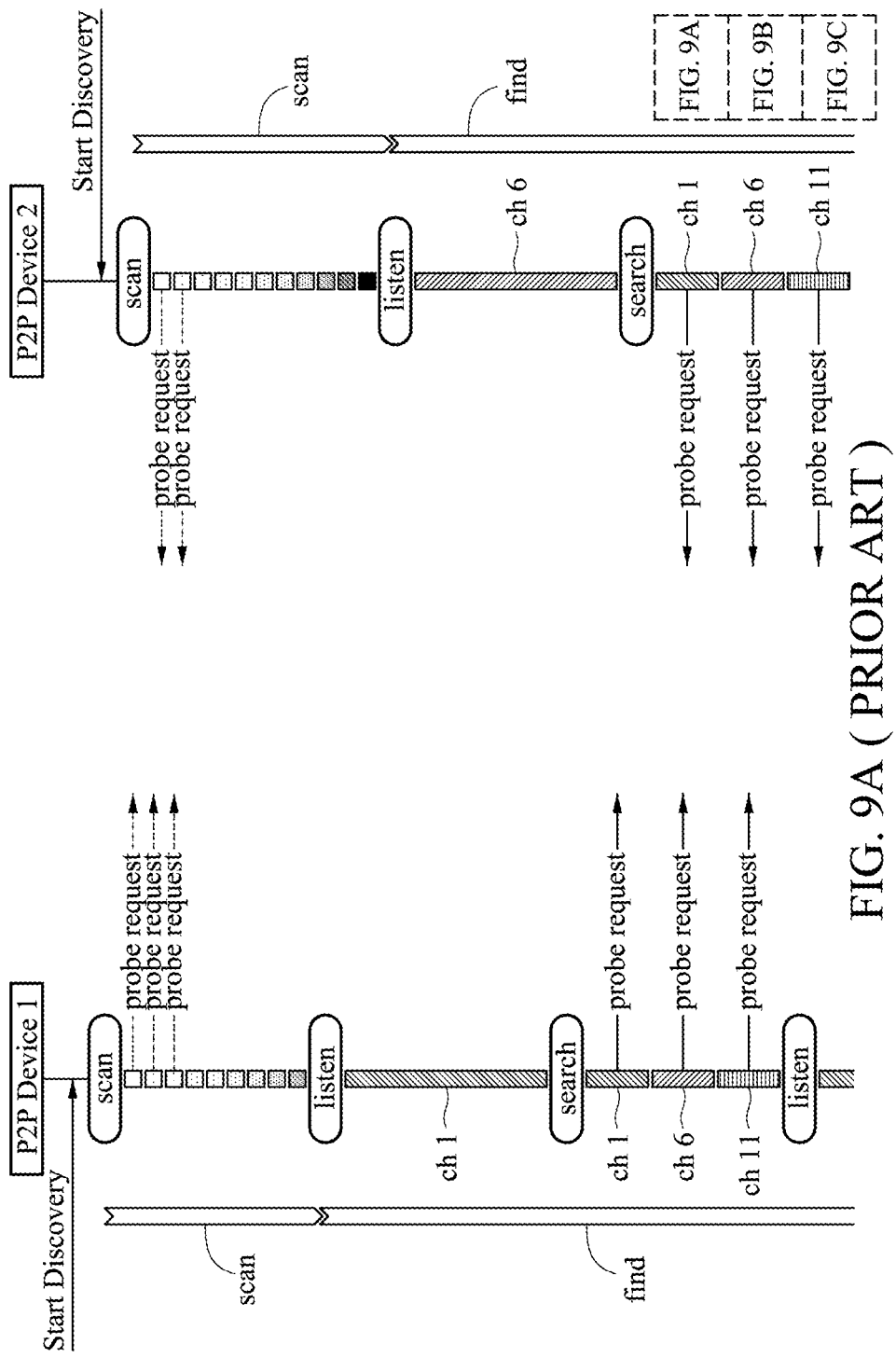
FIG. 9A-FIG. 9C show the exemplary message sequence diagram of the prior art in a scenario of two P2P devices discovering each other in compliance with a Wi-Fi Direct standard.
Figure 9B:
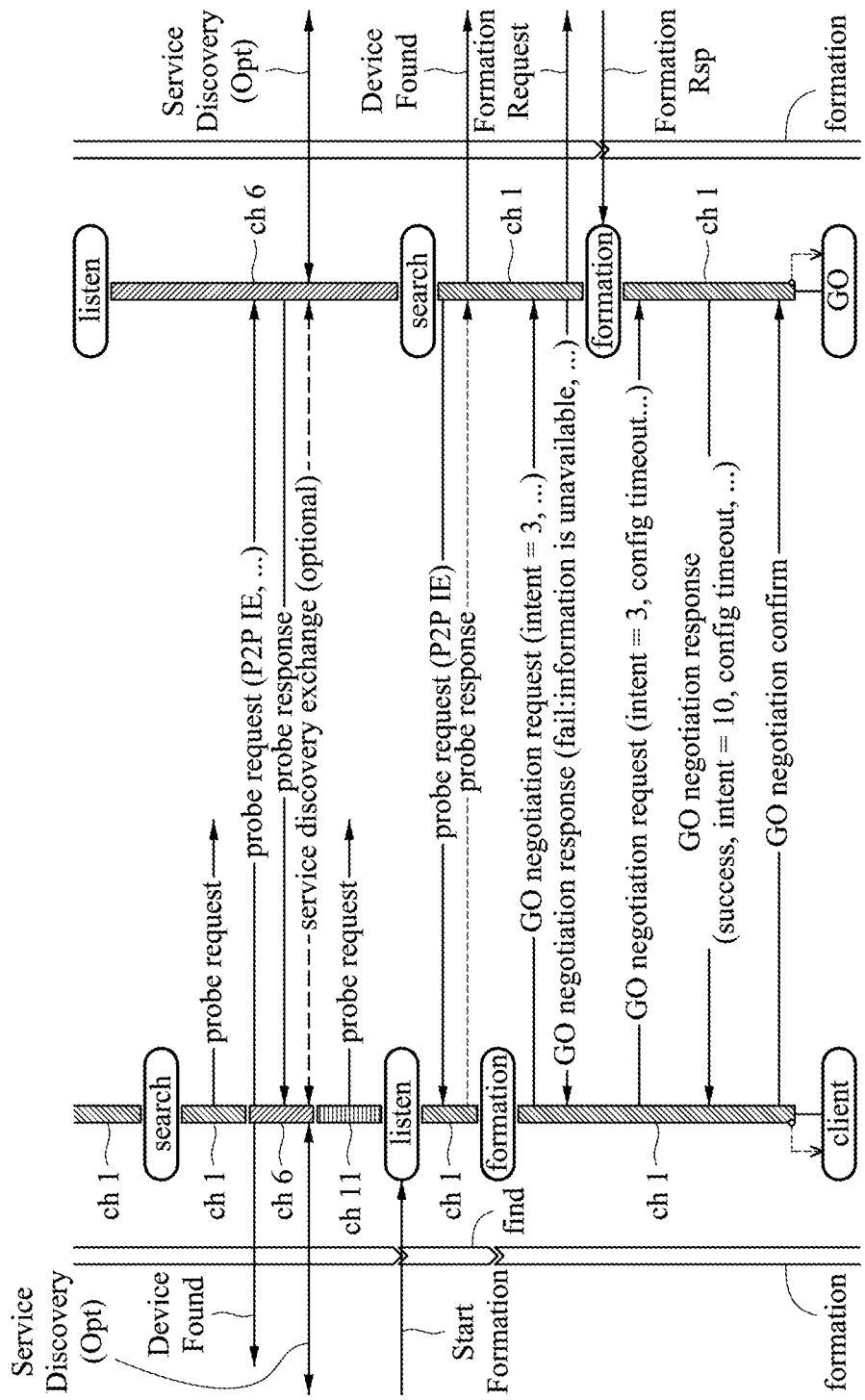
Figure 9C:
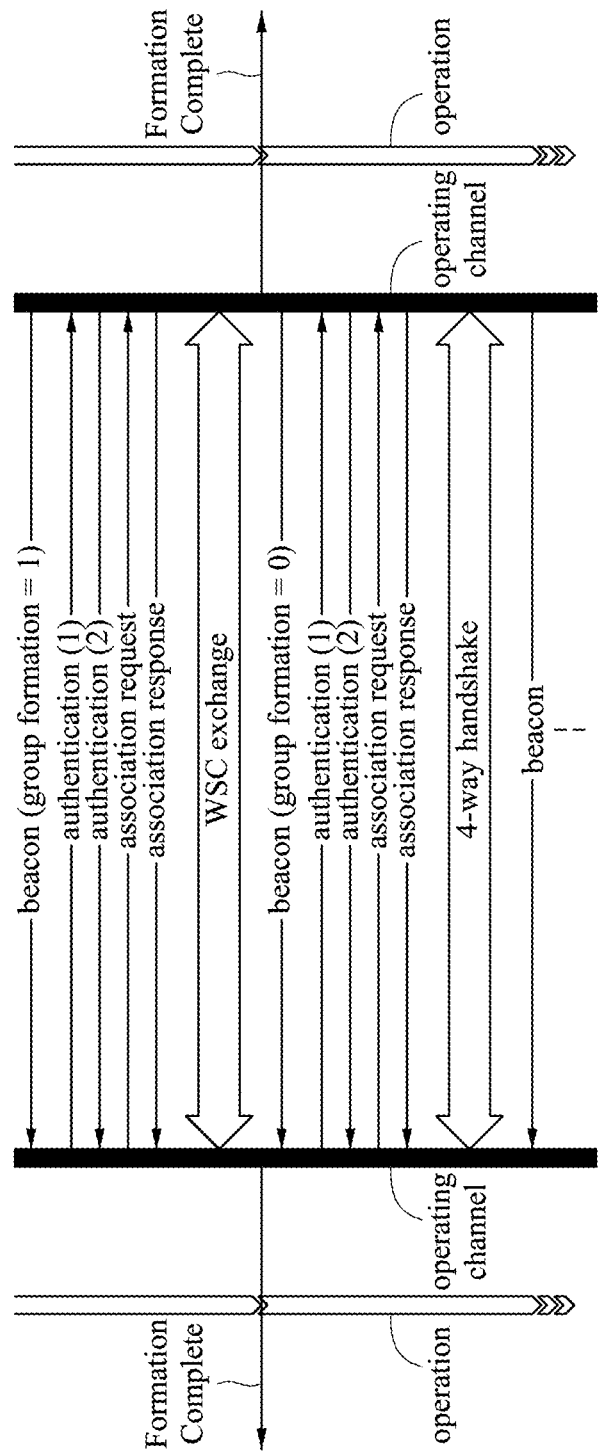

FIG. 9A-FIG. 9C show the exemplary message sequence diagram of the prior art in a scenario of two P2P devices discovering each other in compliance with a Wi-Fi Direct standard, where group formation occurs on Listen channel of device A (such as P2P Device 1 in FIG. 9A). As shown in FIG. 9A-FIG. 9C, during the device discovery, the device A and device B (such as P2P Device 2 in FIG. 9A) may sequentially operate in the scan state, listen state and search sate. In the scan state, the device A/device B may transmit a probe request message in all Wi-Fi channels. In the listen state, the device A/device B may listen to one Wi-Fi channel. In the search state, the device A/device B may further transmit a probe request message in some specific Wi-Fi channels. When the device A/device B finds each other, a formation request is transmitted to start the procedure of GO negotiation. After the GO negotiation procedure is completed, the device A and device B may authenticate each other and associate with each other. Then, the device A and device B may perform the WSC exchange procedure. After the WSC exchange procedure is completed, the formation is completed. For more details of the message sequence diagram, reference may be made to WiFi_P2P_Technical_Specification_v1.3_r26, page 152.

In general, if the device A wants to set up a Wi-Fi Direct connection with the device B, the device A has to choose the peer client, enter the password for authentication and transmits a plurality of messages for performing the device discovery procedure, the GO negotiation procedure and the WSC exchange procedure as shown in FIG. 8 and FIG. 9A-FIG. 9C. However, according to the embodiments of the invention, by establishing a touch link between the device A and device B via the corresponding touch panel devices, the device discovery procedure, the GO negotiation procedure and the WSC exchange procedure can be skipped and the Wi-Fi Direct connection can be established after the essential information is obtained by the device A and/or device B.

Figure 10:
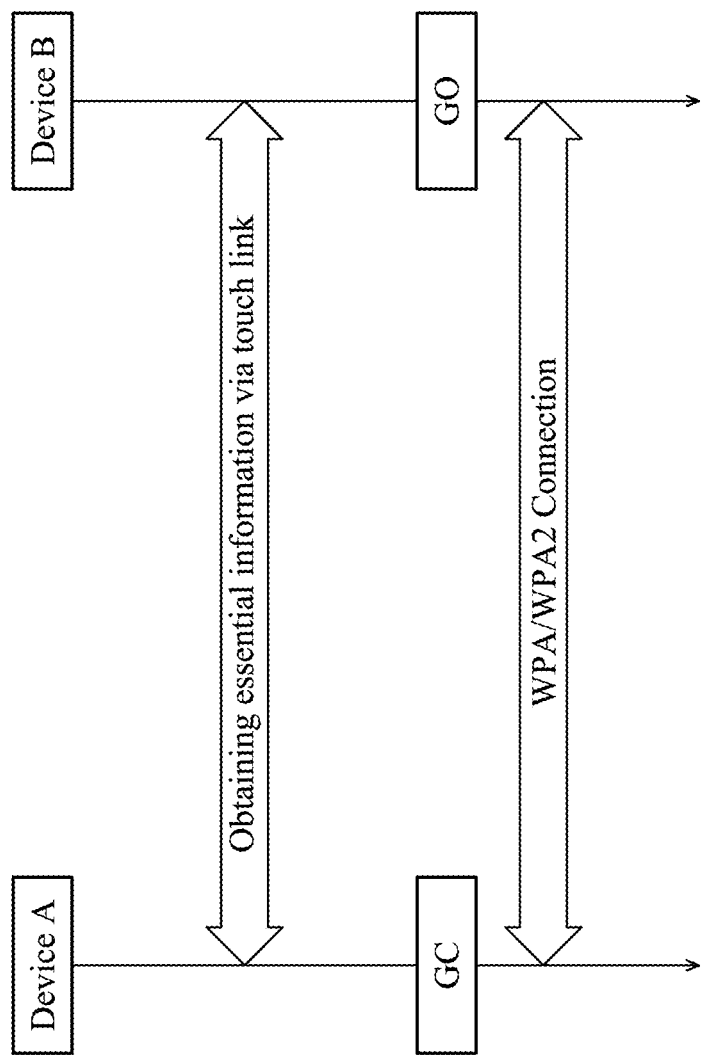
FIG. 10 is a schematic diagram showing the procedure of establishing a Wi-Fi Direct connection according to an embodiment of the invention.

FIG. 10 is a schematic diagram showing the procedure of establishing a Wi-Fi Direct connection according to an embodiment of the invention. As shown in FIG. 10, the essential information utilized for establishing the Wi-Fi Direct connection may be obtained by the device A and/or device B via the touch link established therebetween. After obtaining the essential information, the Wi-Fi Direct connection under WPA/WPA2 protection can be established between the device A and device B according to the essential information. In this manner, in the embodiments of the invention, the Wi-Fi Direct connection can be established without performing the device discovery procedure, the GO negotiation procedure and/or the WSC exchange procedure.

According to an embodiment of the invention, the essential information may comprise the Medium Access Control (MAC) addresses of the electronic device(s) (e.g. the device A and/or the device B), the IP addresses of the electronic device(s) (e.g. the device A and/or the device B), the Vendor ID of the electronic device, the service set identification (SSID) of the GO (e.g. the device A or the device B), the authentication type of the GO, the encryption type of the GO, the key of the GO, a Wi-Fi credential of the GO, etc.

Figure 11:
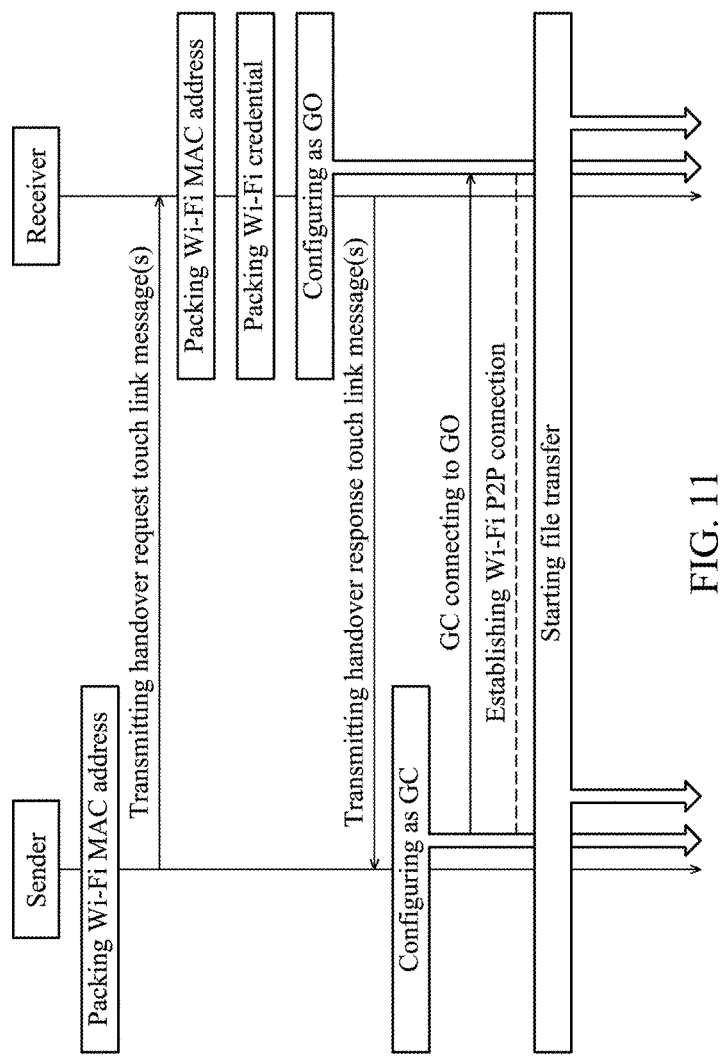
FIG. 11 is a schematic diagram showing the procedure of establishing a Wi-Fi Direct connection when the GO and GC are set by default according to an embodiment of the invention.

FIG. 11 is a schematic diagram showing the procedure of establishing a Wi-Fi Direct connection when the GO and GC are set by default according to an embodiment of the invention. In the embodiment, the sender initiating the touch link is preset to act as the GC and the receiver side is preset to act as the GO, and the sender and receiver are both electronic devices supporting the touch communications technology. The sender may pack its Wi-Fi MAC address in one or more handover request touch link messages and transmit the one or more handover request touch link messages to the receiver. The receiver may also pack its Wi-Fi MAC address and Wi-Fi credential in one or more handover response touch link messages and transmit the one or more handover response touch link messages to the sender. The receiver may be configured as the GO and the sender may be configured as the GC. The GC may connect to the GO via touch link and "handover" the connection bearer to Wi-Fi by establishing the Wi-Fi P2P connection according to the essential information obtained from the touch link messages. After Wi-Fi P2P connection is established, the sender and receiver may start file transfer via the Wi-Fi P2P connection. It should be noted that file transfer is only an illustration of operation that can be performed after the wireless communication connection is established, but not limitation. Any other operation via wireless communication connection can be performed according to different embodiments. It should also be noted that in the embodiments, the GC connecting to the GO and Wi-Fi P2P connection establishment may be performed via either Wi-Fi direct technology or the touch communications technology, and the invention should not be limited to either case.

In this embodiment, since the sender and the receiver are placed close enough to establish the touch link, the device discovery procedure can be skipped. In addition, since the GO and GC are set by default (for example, set via software codes or application), the GO negotiation procedure can also be skipped. In addition, since the Wi-Fi Credentials may also be delivered to GC through the touch link, the GC can apply credentials directly and the WSC procedure can also be skipped. Therefore, there may also be no need for the user of the electronic device to push a button or enter a password for establishing the Wi-Fi P2P connection. With these features, the Wi-Fi Direct connection can be quickly set up and established between the two electronic devices when compared to the prior-art as shown in FIG. 8 and FIG. 9A-FIG. 9C.

Figure 12:
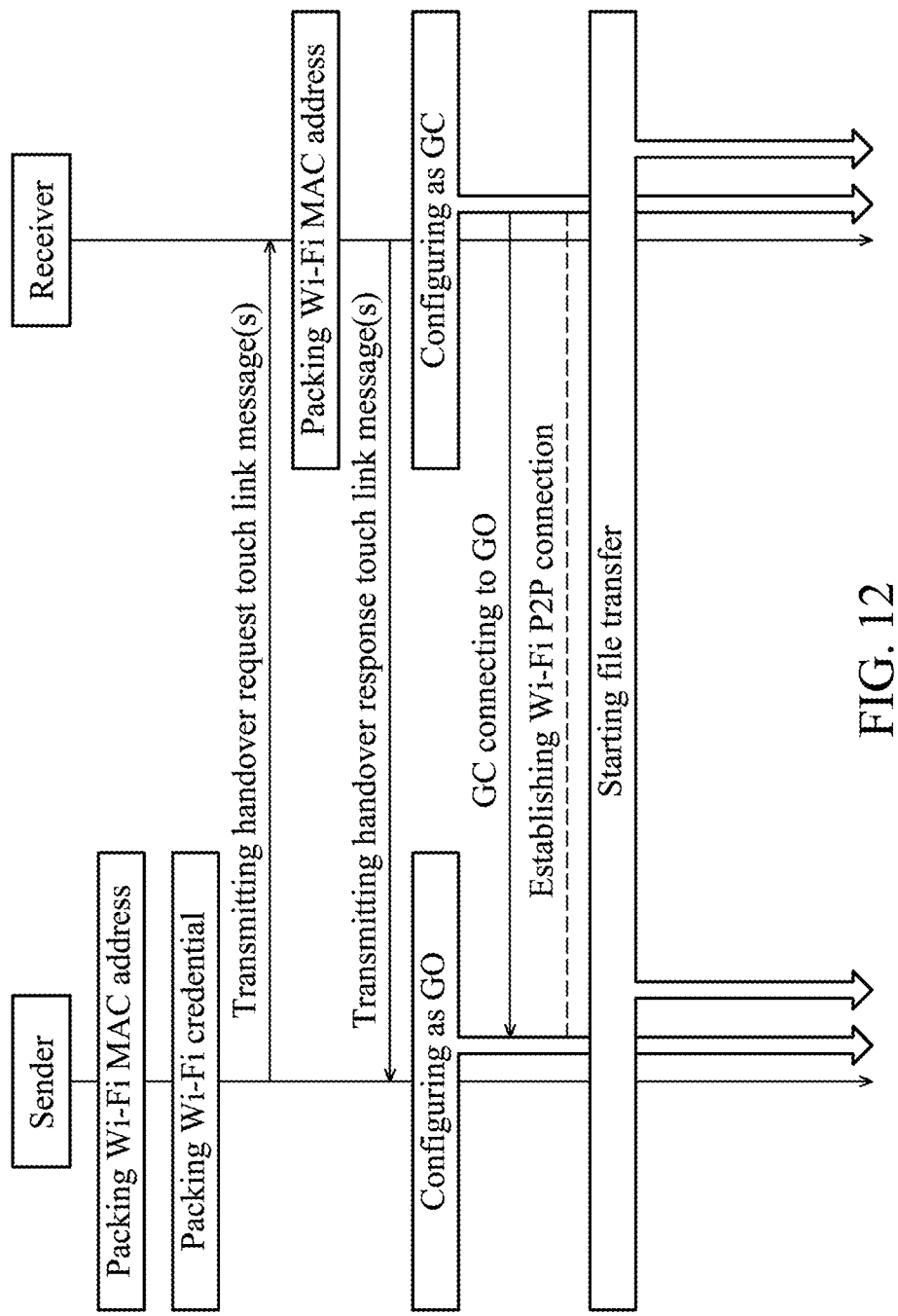
FIG. 12 is a schematic diagram showing the procedure of establishing a Wi-Fi Direct connection when the GO and GC are set by default according to another embodiment of the invention.

FIG. 12 is a schematic diagram showing the procedure of establishing a Wi-Fi Direct connection when the GO and GC are set by default according to another embodiment of the invention. In the embodiment, the sender initiating the touch link is preset to act as the GO and the receiver side is preset to act as the GC, and the sender and receiver are both electronic devices supporting the touch communications technology. The sender may pack its Wi-Fi MAC address and Wi-Fi credential in one or more handover request touch link messages and transmit the one or more handover request touch link messages to the receiver. The receiver may also pack its Wi-Fi MAC address in one or more handover response touch link messages and transmit the one or more handover response touch link messages to the sender. The sender may be configured as the GO and the receiver may be configured as the GC. The GC may connect to the GO via touch link and "handover" the connection bearer to Wi-Fi by establishing the Wi-Fi P2P connection according to the essential information obtained from the touch link messages. After Wi-Fi P2P connection is established, the sender and receiver may start file transfer via the Wi-Fi P2P connection. It should be noted that file transfer is only an illustration of operation that can be performed after the wireless communication connection is established, but not limitation. Any other operation via wireless communication connection can be performed according to different embodiments. It should also be noted that in the embodiments, the GC connecting to the GO and Wi-Fi P2P connection establishment may be performed via either Wi-Fi direct technology or the touch communication technology, and the invention should not be limited to either case.

In this embodiment, since the sender and the receiver are placed close enough to establish the touch link, the device discovery procedure can be skipped. In addition, since the GO and GC are set by default (for example, set via software codes or application), the GO negotiation procedure can also be skipped. In addition, since the Wi-Fi Credentials may also be delivered to a GC through the touch link, the GC can apply the credentials directly and the WSC procedure can also be skipped. Therefore, there may also be no need for the user of the electronic device to push a button or enter a password for establishing the Wi-Fi P2P connection. With these features, the Wi-Fi Direct connection can be quickly set up and established between the two electronic devices when compared to the prior-art as shown in FIG. 8 and FIG. 9A-FIG. 9C.

Figure 13:
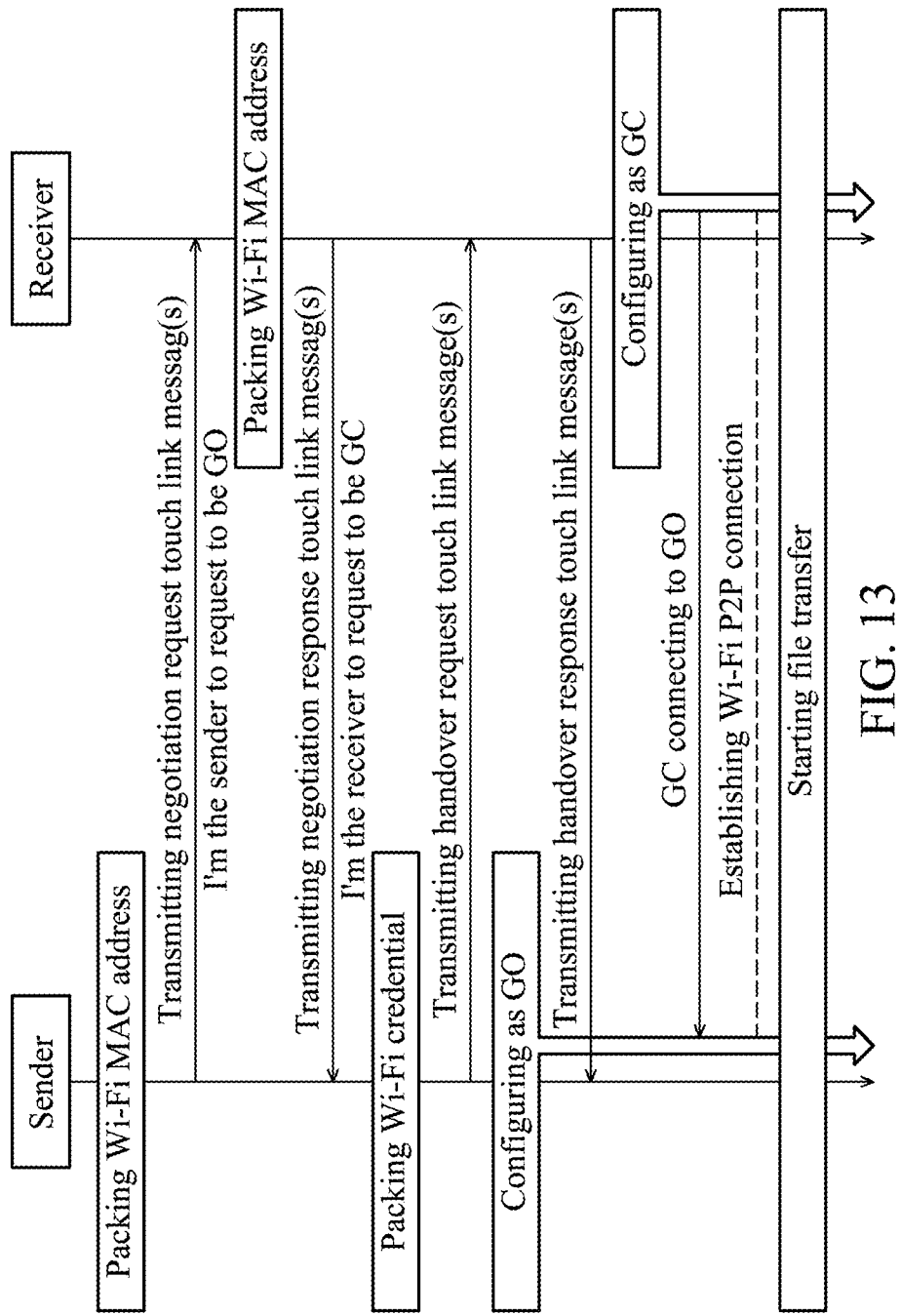
FIG. 13 is a schematic diagram showing the procedure of establishing a Wi-Fi Direct connection with GO negotiation via touch link according to an embodiment of the invention.

FIG. 13 is a schematic diagram showing the procedure of establishing a Wi-Fi Direct connection with GO negotiation via touch link according to an embodiment of the invention. In the embodiment, the sender and receiver are both electronic devices supporting the touch communications technology. The sender may pack its Wi-Fi MAC address in one or more negotiation request touch link messages and transmit the one or more negotiation request touch link messages to the receiver to request to be the GO. The receiver may also pack its Wi-Fi MAC address in one or more negotiation response touch link messages and transmit the one or more negotiation response touch link messages to the sender to request to be the GC. The sender may further pack its Wi-Fi credential in one or more handover request touch link messages and transmit the one or more handover request touch link messages to the receiver. The receiver may further transmit one or more handover response touch link messages to the sender. The sender may be configured as the GO and the receiver may be configured as the GC. The GC may connect to the GO via touch link and "handover" the connection bearer to Wi-Fi by establishing the Wi-Fi P2P connection according to the essential information obtained from the touch link messages. After a Wi-Fi P2P connection is established, the sender and receiver may start file transfer via the Wi-Fi P2P connection. It should be noted that file transfer is only an illustration of operation that can be performed after the wireless communication connection is established, but not limitation. Any other operation via wireless communication connection can be performed according to different embodiments. It should also be noted that in the embodiments, the GC connecting to the GO and Wi-Fi P2P connection establishment may be performed via either Wi-Fi direct technology or the touch communications technology, and the invention should not be limited to either case.

In this embodiment, since the sender and the receiver are placed close enough to establish the touch link, the device discovery procedure can be skipped. In addition, since the Wi-Fi Credentials may also be delivered to GC through the touch link, the GC can apply credential directly and the WSC procedure can also be skipped. Therefore, there may also be no need to trigger user of the electronic device to push a button or enter password for establishing the Wi-Fi P2P connection. With these feature, the Wi-Fi Direct connection can be fast setup and established between the two electronic devices when compared to the prior-art as shown in FIG. 8 and FIG. 9A-FIG. 9C.

Figure 14:
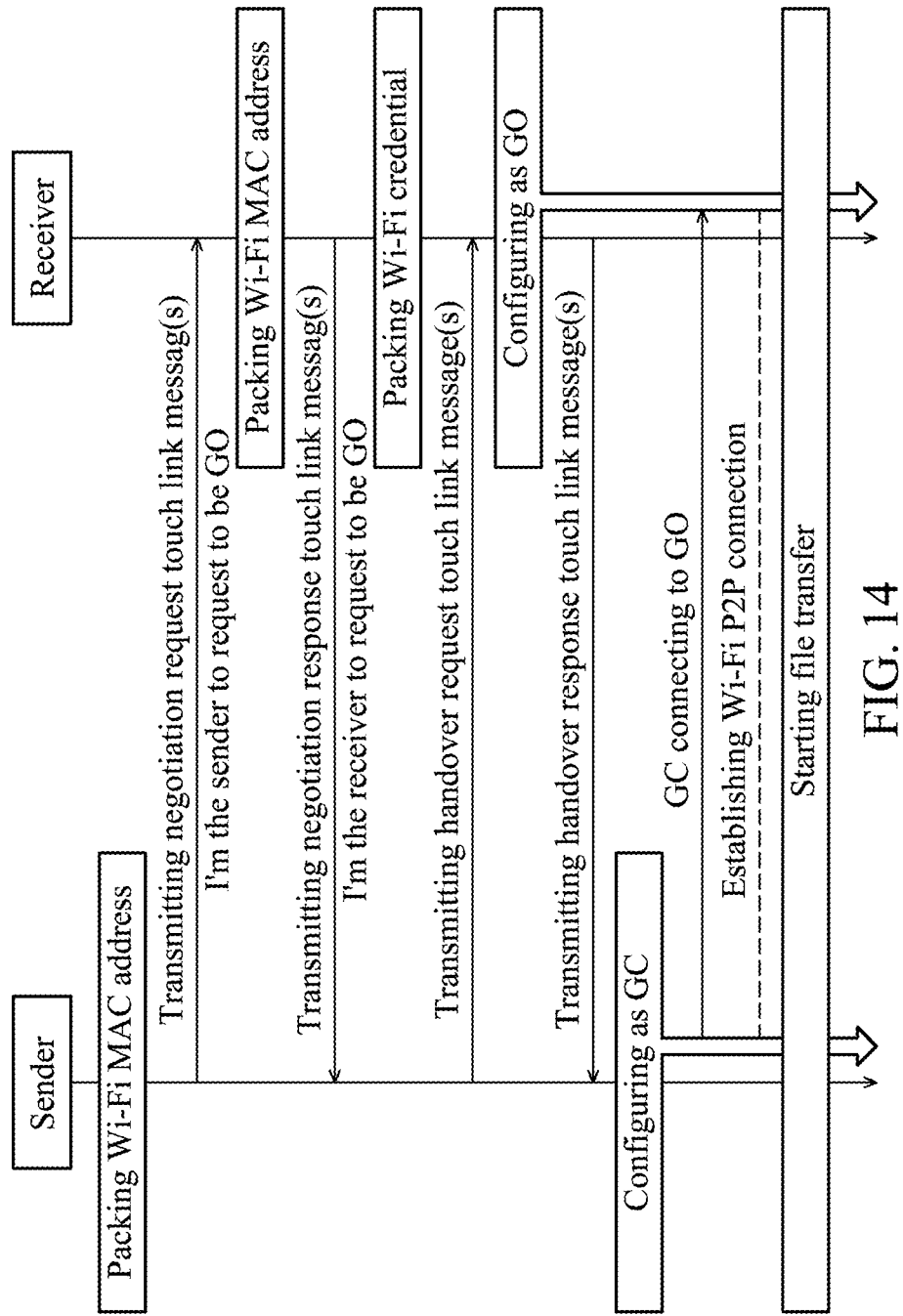
FIG. 14 is a schematic diagram showing the procedure of establishing a Wi-Fi Direct connection with GO negotiation via touch link according to another embodiment of the invention.

FIG. 14 is a schematic diagram showing the procedure of establishing a Wi-Fi Direct connection with GO negotiation via touch link according to another embodiment of the invention. In the embodiment, the sender and receiver are both electronic devices supporting the touch communications technology. The sender may pack its Wi-Fi MAC address in one or more negotiation request touch link messages and transmit the one or more negotiation request touch link messages to the receiver to request to be the GO. The receiver may also pack its Wi-Fi MAC address in one or more negotiation response touch link messages and transmit the one or more negotiation response touch link messages to the sender to request to be the GO. Note that, in this embodiment, the receiver does not agree with being the GC and requests to be the GO. When the sender agrees to be the GC, the sender may transmit one or more handover request touch link messages to the receiver. The receiver may pack its Wi-Fi credential in one or more handover response touch link messages and transmit one or more handover response touch link messages to the sender. After the GO negotiation via the touch link, the receiver may be configured as the GO and the sender may be configured as the GC. The GC may connect to the GO via touch link and "handover" the connection bearer to Wi-Fi by establishing the Wi-Fi P2P connection according to the essential information obtained from the touch link messages. After Wi-Fi P2P connection is established, the sender and receiver may start file transfer via the Wi-Fi P2P connection. It should be noted that file transfer is only an illustration of operation that can be performed after the wireless communication connection is established, but not limitation. Any other operation via wireless communication connection can be performed according to different embodiments. It should also be noted that in the embodiments, the GC connecting to the GO and Wi-Fi P2P connection establishment may be performed via either Wi-Fi direct technology or the touch communications technology, and the invention should not be limited to either case.

In this embodiment, since the sender and the receiver are placed close enough to establish the touch link, the device discovery procedure can be skipped. In addition, since the Wi-Fi Credentials may also be delivered to GC through the touch link, the GC can apply credential directly and the WSC procedure can also be skipped. Therefore, there may also be no need to trigger user of the electronic device to push a button or enter password for establishing the Wi-Fi P2P connection. With these feature, the Wi-Fi Direct connection can be fast setup and established between the two electronic devices when compared to the prior-art as shown in FIG. 8 and FIG. 9A-FIG. 9C.

Figure 15:
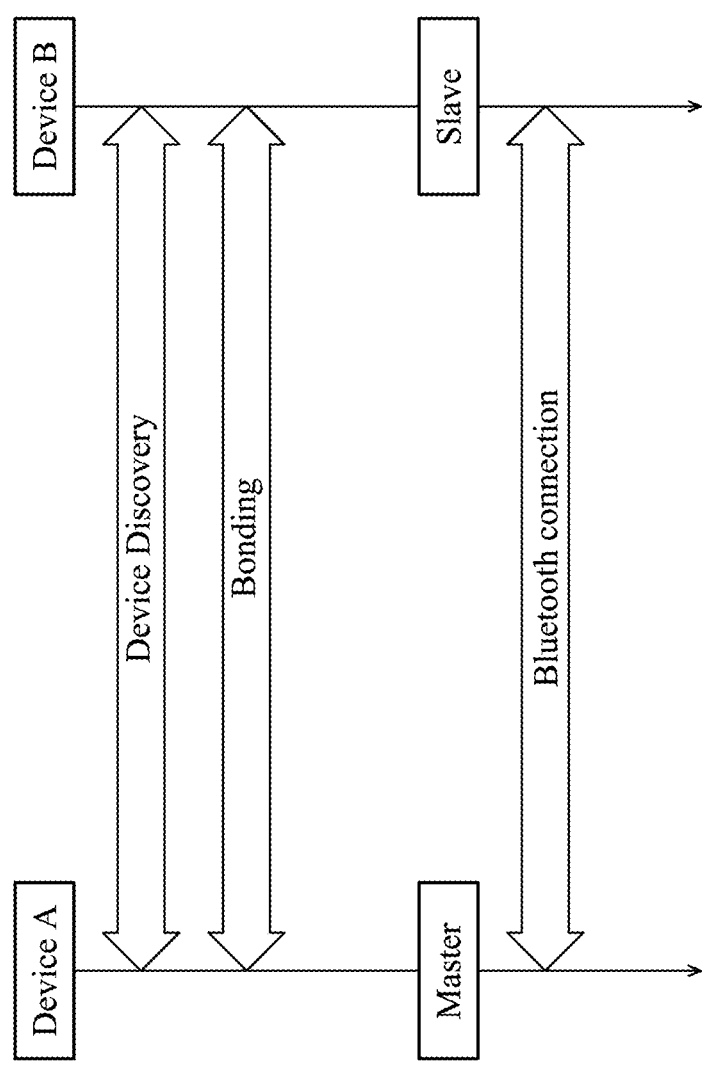
FIG. 15 is a schematic diagram showing the prior art procedure of establishing a Bluetooth connection in compliance with a Bluetooth standard.

FIG. 15 is a schematic diagram showing the prior art procedure of establishing a Bluetooth connection in compliance with a Bluetooth standard. Bluetooth is a wireless technology standard for exchanging data over short distances from fixed and mobile devices and building personal area networks (PANs). In the prior art procedure of establishing a Bluetooth connection, two electronic devices: device A and device B first perform device discovery to discover and be aware of the capability of each other. When the device A and device B found each other, bonding is performed. Thereafter, the Bluetooth connection can be established.

Figure 16:
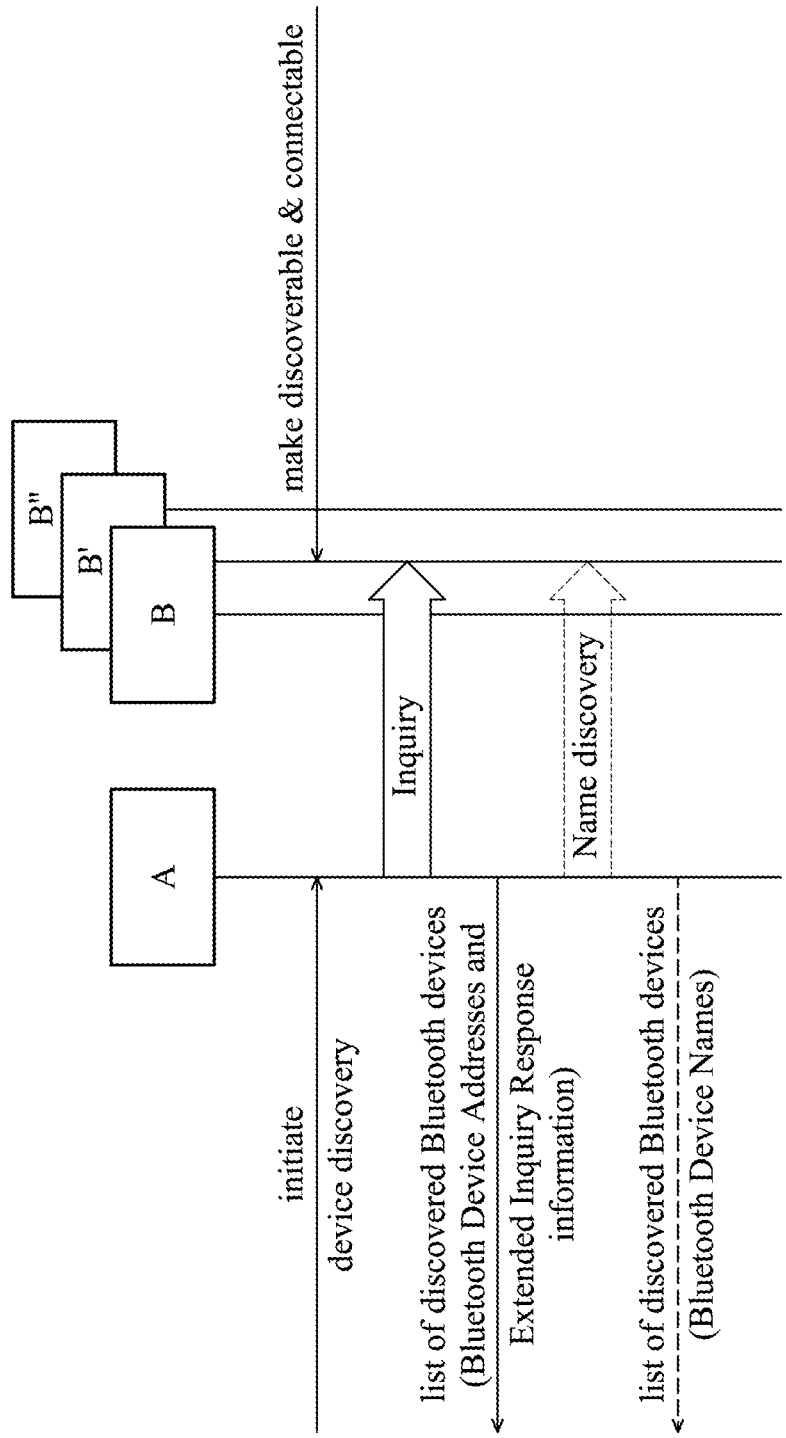
FIG. 16 is an exemplary message sequence diagram of the prior art device discovery procedure.

FIG. 16 is an exemplary message sequence diagram of the prior art device discovery procedure. During the device discovery procedure, an inquiry (either general or limited) is performed first, and then name discovery is done towards some or all of the devices that responded to the inquiry. If the initiator of the device discovery receives a complete local name or a shortened local name that is considered long enough, via an extended inquiry response from a remote device, the initiator should not do a separate name discovery for that device. For more details of the message sequence diagram, reference may be made to Specification of the Bluetooth System, Core_V4.0, page 1679.

Figure 17:
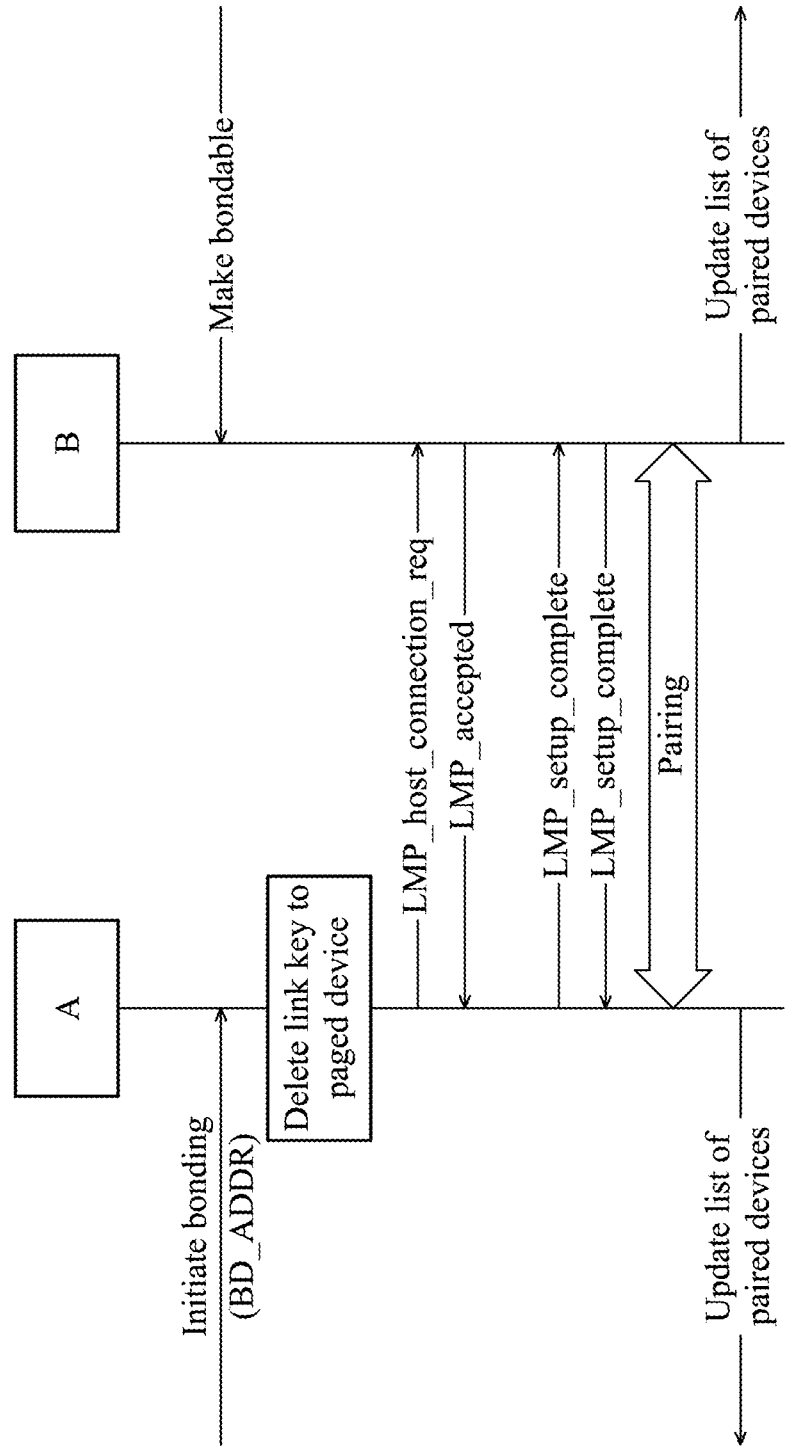
FIG. 17 is an exemplary message sequence diagram of the prior art general bounding procedure.

FIG. 17 is an exemplary message sequence diagram of the prior art general bounding procedure. General Bonding refers to the process of performing bonding during connection setup or channel establishment procedures as a precursor to accessing a service. When the devices that are performing General Bonding both support Secure Simple Pairing, the Authentication_Requirements parameter should be set to MITM Protection Not Required—General Bonding unless the security policy of an available local service requires MITM Protection in which case the Authentication_Requirements parameter shall be set to MITM Protection Required—General Bonding. 'No bonding' is used when the device is performing a Secure Simple Pairing procedure, but does not intend to retain the link key after the physical link is disconnected. For more details of the message sequence diagram, reference may be made to Specification of the Bluetooth System, Core_V4.0, page 1680.

Figure 18:
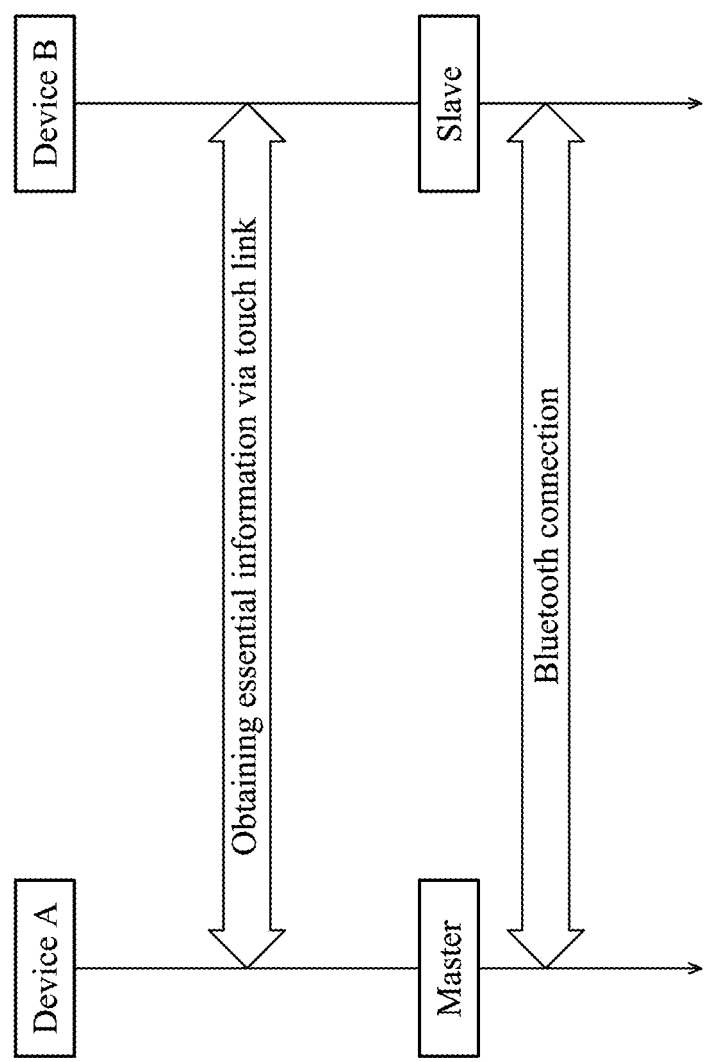
FIG. 18 is a schematic diagram showing the procedure of establishing a Bluetooth connection according to an embodiment of the invention.

FIG. 18 is a schematic diagram showing the procedure of establishing a Bluetooth connection according to an embodiment of the invention. As shown in FIG. 18, the essential information utilized for establishing the Bluetooth connection can be obtained by the device A and/or device B via the touch link established therebetween. After obtaining the essential information, the Bluetooth connection can be established between the device A and device B according to the essential information. In this manner, in the embodiments of the invention, the Bluetooth connection can be established without performing the device discovery procedure and/or at least a portion of the bonding procedure.

Figure 19:
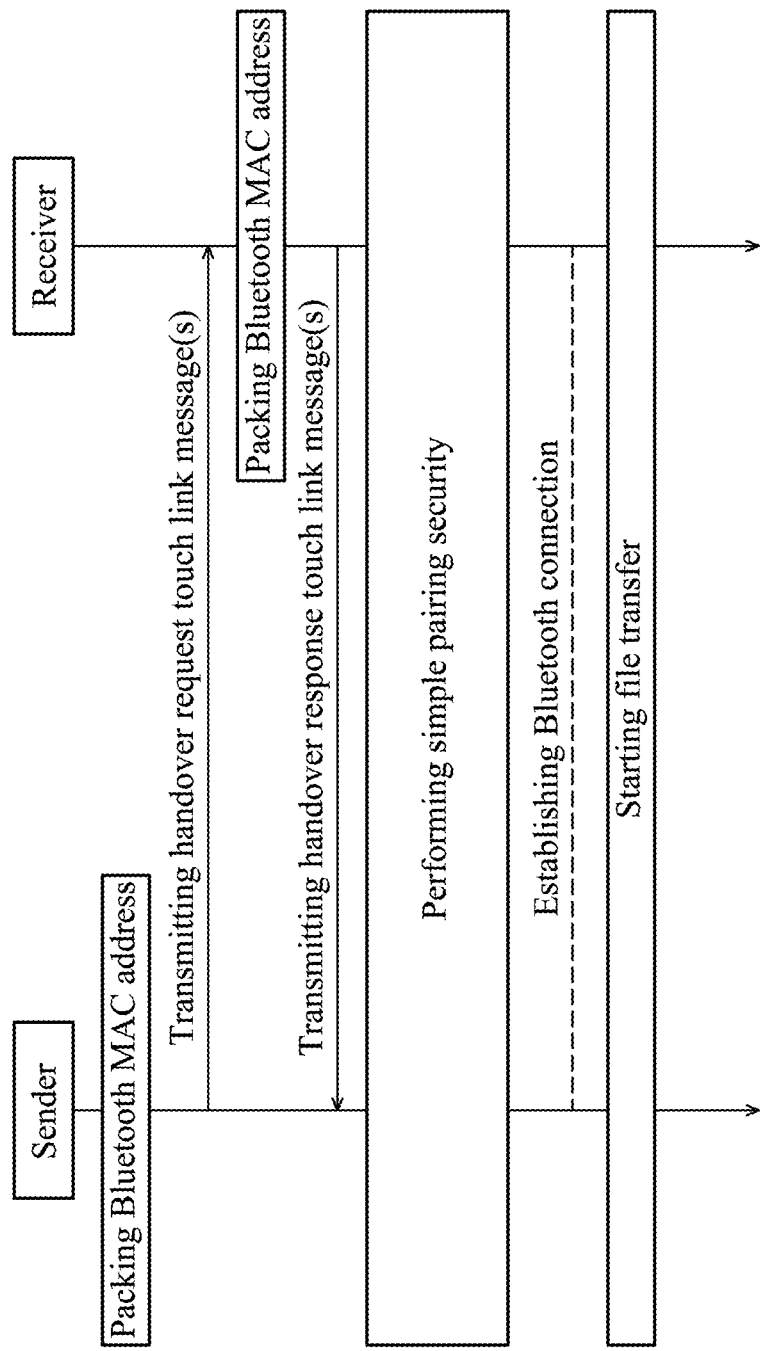
FIG. 19 is a schematic diagram showing the procedure of establishing a Bluetooth connection according to an embodiment of the invention.

FIG. 19 is a schematic diagram showing the procedure of establishing a Bluetooth connection according to an embodiment of the invention. In the embodiment, the sender and receiver are both electronic devices supporting the touch communications technology. The sender may pack its Bluetooth MAC address in one or more handover request touch link messages and transmit the one or more handover request touch link messages to the receiver. The receiver may also pack its Bluetooth MAC address in one or more handover response touch link messages and transmit the one or more handover response touch link messages to the sender. Next, simple pairing security can be performed by the sender and receiver. When performing the simple pairing security, PIN code can be transmitted via the touch link. The sender and/or receiver can generate link key according to the PIN code and perform authentication and encryption according to the link key. Therefore, at least a portion of the conventional bonding procedure can be skipped when performing the simple pairing security. Note that in some embodiments of the invention, the overall bonding procedure may also be skipped since the essential information can be obtained via the touch link, and the invention should not be limited thereto. After a Bluetooth connection is established, the sender and receiver may start file transfer via the Bluetooth connection. It should be noted that file transfer is only an illustration of operation that can be performed after the wireless communication connection is established, but not limitation. Any other operation via wireless communication connection can be performed according to different embodiments.

In this embodiment, since the sender and the receiver are placed close enough to establish the touch link, the device discovery procedure can be skipped. In addition, as comparing to the prior art, at least a portion of the conventional bonding procedure can also be skipped. With these feature, the Bluetooth connection can be fast setup and established between the two electronic devices when compared to the prior-art as shown in FIG. 15, FIG. 16 and FIG. 17.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. An electronic device, comprising:
a processor, transmitting one or more touch link messages via at least one transmitting electrode of a touch panel device to another electronic device in proximity to the electronic device and receiving one or more touch link messages via at least one receiving electrode of the touch panel device from the other electronic device to obtain essential information for establishing a wireless communication connection with the other electronic device; and
a wireless communication module, establishing the wireless communication connection with the other electronic device according to the essential information,
wherein the wireless communication module establishes the wireless communication connection without performing device discovery, and
wherein the essential information comprises an MAC address, an IP address, a Vendor ID or a service set identification (SSID) of the other electronic device.

2. The electronic device as claimed in claim 1, wherein the wireless communication module is a Wi-Fi communication module, and wherein the wireless communication module establishes a Wi-Fi Direct connection with the other electronic device according to the essential information.

3. The electronic device as claimed in claim 2, wherein the essential information further comprises MAC address of the electronic device and a Wi-Fi credential required in establishing the Wi-Fi Direct connection according to the essential information.

4. The electronic device as claimed in claim 2, wherein the wireless communication module establishes the Wi-Fi Direct connection without performing group owner negotiation.

5. The electronic device as claimed in claim 2, wherein the wireless communication module establishes the Wi-Fi Direct connection without performing Wi-Fi simple configuration (WSC) exchange.

6. The electronic device as claimed in claim 1, wherein the wireless communication module is a Bluetooth communication module, and wherein the wireless communication module establishes a Bluetooth connection with the other electronic device according to the essential information.

7. The electronic device as claimed in claim 6, wherein wireless communication module establishes the Bluetooth connection without performing at least a portion of bonding.

8. A method to set up a wireless communication connection, comprising:
transmitting one or more first touch link messages via at least one transmitting electrode of a touch panel device of a first electronic device to a second electronic device in proximity to the first electronic device;
receiving one or more second touch link messages via at least one receiving electrode of the touch panel device of the first electronic device from the second electronic device;
obtaining essential information of the second electronic device for establishing a wireless communication connection from the one or more second touch link messages; and
establishing the wireless communication connection between the first electronic device and the second electronic device according to the essential information of the second electronic device without performing device discovery,
wherein the essential information obtained from the one or more second touch link messages comprises an MAC address, an IP address, a Vendor ID or a service set identification (SSID) of the second electronic device.

9. The method as claimed in claim 8, further comprising packing essential information of the first electronic device for establishing the wireless communication connection in the one or more first touch link messages, wherein when the wireless communication connection is a Wi-Fi Direct connection, and wherein the essential information packed in the one or more first touch link messages comprises a MAC address and a Wi-Fi credential of the first electronic device.

10. The method as claimed in claim 8, wherein the wireless communication connection is a Wi-Fi Direct connection, and wherein the essential information obtained from the one or more second touch link messages further comprises a Wi-Fi credential of the second electronic device.

11. The method as claimed in claim 8, further comprising packing essential information of the first electronic device for establishing the wireless communication connection in one or more first touch link messages, wherein the wireless communication connection is a Bluetooth connection and wherein the essential information packed in the one or more first touch link messages comprises a MAC address of the first electronic device.

12. The method as claimed in claim 8, wherein the wireless communication connection is a Bluetooth connection.

13. The method as claimed in claim 8, wherein the wireless communication connection is a Wi-Fi Direct connection, and wherein the wireless communication connection is established between the first electronic device and the second electronic device without further performing GO negotiation and WSC exchange.

14. The method as claimed in claim 8, wherein the wireless communication connection is a Bluetooth connection, and wherein the wireless communication connection is established between the first electronic device and the second electronic device without further performing at least a portion of bonding.

15. A method to set up a wireless communication connection, comprising:
receiving one or more first touch link messages via at least one receiving electrode of a touch panel device of a first electronic device from a second electronic device in proximity to the first electronic device;
packing essential information of the first electronic device for establishing a wireless communication connection in one or more second touch link messages;
transmitting the one or more second touch link messages via at least one transmitting electrode of the touch panel device of the first electronic device to the second electronic device; and establishing the wireless communication connection between the first electronic device and the second electronic device according to the essential information of the first electronic device without performing GO negotiation, wherein the essential information packed in the one or more second touch link messages comprises a MAC address, an IP address, a Vendor ID, a service set identification (SSID), an authentication type, an encryption type, a key and/or a Wi-Fi credential of the first electronic device.

16. The method as claimed in claim 15, further comprising obtaining essential information of the second electronic device for establishing the wireless communication connection from the one or more first touch link messages, wherein the wireless communication connection is a Wi-Fi Direct connection, and wherein the essential information obtained from the one or more first touch link messages comprises a MAC address and a Wi-Fi credential of the second electronic device.

17. The method as claimed in claim 15, wherein the wireless communication connection is a Wi-Fi Direct connection.

18. The method as claimed in claim 15, wherein the wireless communication connection is a Wi-Fi Direct connection, and wherein the wireless communication connection is established between the first electronic device and the second electronic device without further performing device discovery and WSC exchange.

\* \* \* \* \*